(12) United States Patent
Kimura (10) Patent No.: US 6,369,338 B1
(45) Date of Patent: Apr. 9, 2002

(54) WEIGHING SCALE FOR DETERMINING THE WEIGHT OF A PREGNANT WOMAN

(75) Inventor: Kentaro Kimura, Tokyo (JP)

(73) Assignee: Tanita Corporation, Tokyo (JP)

( * ) Notice: Subject to any disclaimer, the term of this patent is extended or adjusted under 35 U.S.C. 154(b) by 0 days.

(21) Appl. No.: 09/630,017

(22) Filed: Jul. 31, 2000

(30) Foreign Application Priority Data

Aug. 12, 1999 (JP) ............................................ 11-228726

(51) Int. Cl.⁷ ........................ G01G 19/40; G01G 19/00; A61B 10/00
(52) U.S. Cl. .............................. 177/25.16; 177/25.19; 177/245; 600/551; 700/305; 702/173
(58) Field of Search ..................... 177/25.19, 25.16, 177/245; 600/551, 587; 700/305, 90; 702/173, 175, 129, 101

(56) References Cited

U.S. PATENT DOCUMENTS

| | | | |
|---|---|---|---|
| 4,577,710 A | | 3/1986 | Ruzumna .................... 177/245 |
| 4,773,492 A | | 9/1988 | Ruzumna ...................... 177/25 |
| 4,844,187 A | | 7/1989 | Jabero ............................. 177/5 |
| 5,499,457 A | * | 3/1996 | Weiler et al. ................ 177/245 |
| 5,611,351 A | * | 3/1997 | Sato et al. ................... 177/245 |
| 5,636,870 A | * | 6/1997 | Enhorning ...................... 283/2 |
| 5,763,837 A | * | 6/1998 | Davignon et al. .......... 177/245 |
| 6,038,465 A | * | 3/2000 | Melton, Jr. ............... 177/25.19 |

FOREIGN PATENT DOCUMENTS

DE          3513684       * 10/1986 .............. 177/25.19

* cited by examiner

*Primary Examiner*—Randy W. Gibson
(74) *Attorney, Agent, or Firm*—McDermott, Will & Emery (57) ABSTRACT

Disclosed is an improved weighing scale for determining a most appropriate antenatal weight of a pregnant woman for each number of the weeks since conception on the basis of the "antenatal weight-to-week" relationship identified in terms of the BMI of the pregnant woman, which index is determined from the height and progestational weight of the pregnant woman, and for making a comparison between the so determined most appropriate antenatal weight and the weight of the pregnant woman measured each week.

13 Claims, 12 Drawing Sheets

WEIGHING SCALE FOR DETERMINING THE WEIGHT OF A PREGNANT WOMAN

BACKGROUND OF THE INVENTION

1. Field of the Invention

The present invention relates to a weighing scale for determining a most appropriate weight of a pregnant woman in terms of her physical features or body mass index (hereinafter abbreviated as "BMI"), the most appropriate weight varying with time, and being determined for each number of antenatal weeks which have passed since conception.

2. Prior Art

Pregnant women's weights have been hitherto monitored by comparing their antenatal weights with progestational ones prior to conception to determine the increment of weight, thereby making a decision as to whether their weights have been increasing in normal condition or not by referring to weight control tables or other data.

The increment of the weight of a pregnant woman, however, is dependent on the height and progestational weight of the pregnant woman, that is, the BMI of the pregnant woman, and therefore, the weight monitoring cannot be effected appropriately for the purpose so far as the monitoring relies simply on the number of the antenatal weeks since conception and the increment of antenatal weight relative to the progestational weight. As a matter of fact, however, nobody knows how a most appropriate antenatal weight can be determined from the BMI of an individual pregnant woman and the number of the antenatal weeks since conception.

SUMMARY OF THE INVENTION

In view of the above one object of the present invention is to provide a weighing scale for determining a most appropriate antenatal weight of a pregnant woman for each number of the weeks since conception on the basis of the "antenatal weight-to-week" relationship identified in terms of the BMI of the pregnant woman, which index is determined from the height and progestational weight of the pregnant woman, and for making a comparison between the so determined most appropriate antenatal weight and the weight of the pregnant woman measured each week.

Another object of the present invention is to provide such a weighing scale for pregnancy monitoring which is capable of displaying the comparison between the most appropriate antenatal weight and the present weight of the pregnant woman.

To attain these objects a weighing scale for determining the weight of a pregnant woman according to the present invention comprises: a height inputting unit which permits the inputting of the height of the pregnant woman; a weight inputting unit which permits the inputting of her weight prior to conception; a week-number inputting unit which permits the inputting of how many weeks have passed since conception; a memory unit which stores antenatal weight data in terms of the index of physical features; an arithmetic unit which determines a most appropriate weight from the data inputted by said height, weight and week-number inputting units and the data retrieved from said memory unit; and a display unit which displays the result of calculation as the most appropriate antenatal weight.

Said week-number inputting unit may permit the inputting of the expectant birth date in place of the number of weeks since conception.

Said week-number inputting unit may permit the inputting of the umber of weeks since conception.

Said memory unit may store most appropriate weights plotted for different indexes of physical features, which weights vary with each number of weeks since conception.

A weighing scale for determining the weight of a pregnant woman according to the present invention comprises: a height inputting unit which permits the inputting of the height of the pregnant woman; a weight inputting unit which permits the inputting of her weight prior to conception; a week-number inputting unit which permits the inputting of how many weeks have passed since conception; a memory unit which stores weight data in terms of the index of physical features; a weighing device which determines her weight; an arithmetic unit which determines a most appropriate antenatal weight from the data inputted by said height, weight and week-number inputting units and the data retrieved from said memory unit, and which compares the so determined most appropriate antenatal weight with the present weight of the pregnant woman; and a display unit which displays the result of calculation.

Said week-number inputting unit may permit the inputting of the expectant birth date in place of the number of weeks since conception.

Said week-number inputting unit may permit the inputting of the number of weeks since conception.

Said arithmetic unit may allow said display unit to display a warning in response to the antenatal weight increasing a predetermined amount over the most appropriate antenatal weight.

Said memory unit may store most appropriate antenatal weights for different indexes of physical features, which weights vary with the number of weeks since conception.

Said arithmetic unit may allow said display unit to display a warning, provided that the antenatal weight has increased a predetermined amount in a predetermined length of time.

Other objects and advantages of the present invention will be understood from the following description of a weighing scale for weighing the weight of a pregnant woman according to one preferred embodiment of the present invention, which is shown in accompanying drawings:

DESCRIPTION OF THE PREFERRED EMBODIMENTS

Figure 1:
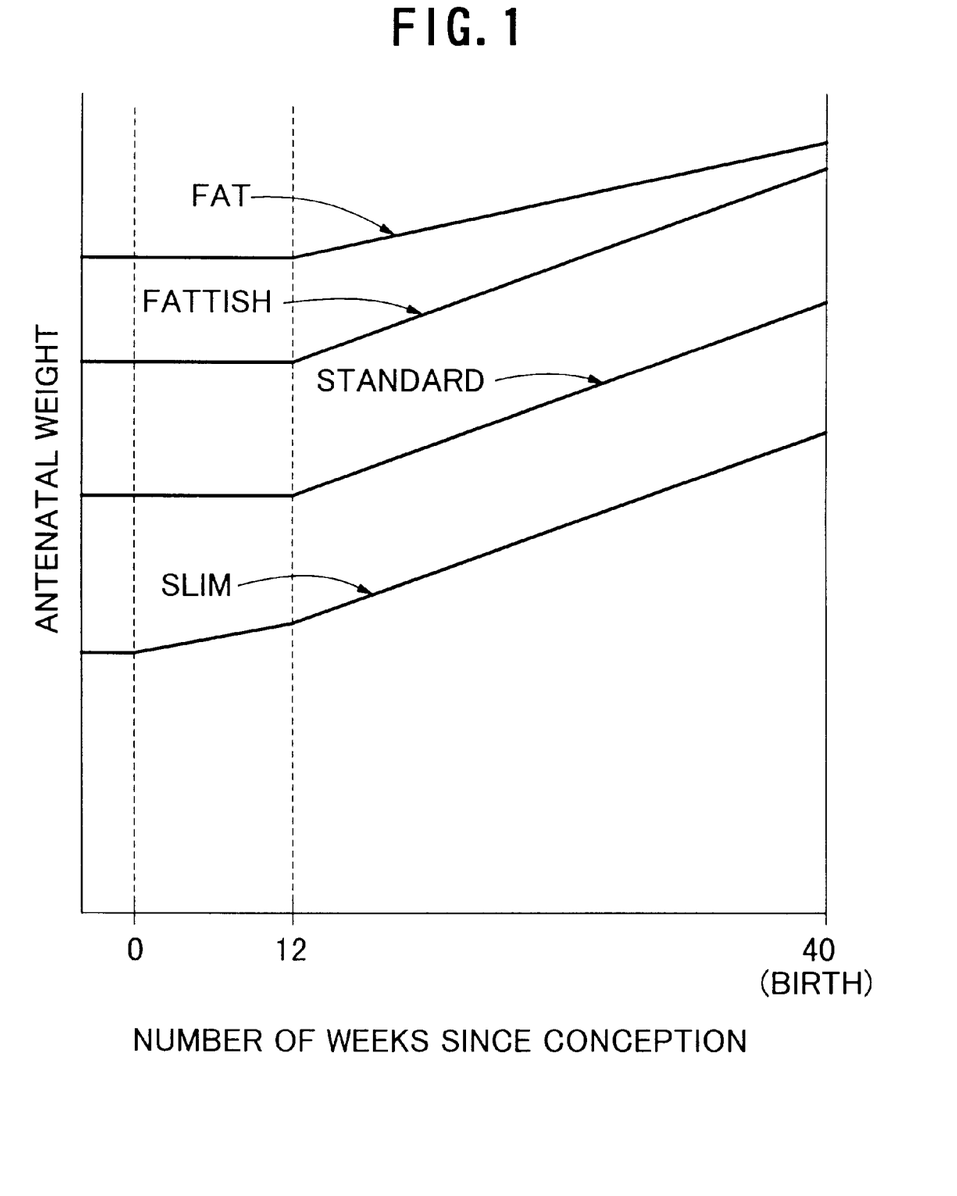
FIG. 1 shows how the weight of a pregnant woman varies with the number of weeks since conception.

FIG. 1 shows how antenatal weights (ordinates) and the number of weeks since conception (abscissa) are related to each other for different BMIs. The index can be given by dividing the weight (kilogram) by the square of the height (meter) of an individual pregnant woman. As seen from the graphic representation, the weights of fattish and standard pregnant women almost level off for the initial period (12 weeks since conception), increasing steadily to reach the progestational weight plus about 8 kilograms on the birth day.

In contrast, the weight of slim pregnant women whose BMI is below 18 rises more or less immediately after conception. After the 12 month-long period it increases at the same rate as the antenatal weights of fattish and standard pregnant women, and finally the weight of the slim pregnant woman reaches the progestational weight plus about 10 kilograms. As for fat pregnant women whose BMI is larger than 30 little increase of weight is perceived even after 12 weeks have passed since conception, and the antenatal weight on the birth day is the progestational weight plus 2 to 3 kilograms. As may be realized, it is necessary that a most appropriate antenatal weight be determined for each week from the graphic representation of FIG. 1, particularly from an antenatal weight-versus-week curve plotted for the progestational BMI of the pregnant woman.

The present antenatal weight is determined to be compared with the most appropriate antenatal weight found for the week in the antenatal weight-versus-week curve, and then, a decision is made as to whether the pregnant woman is too fat or too thin.

Every time the present weight of the pregnant woman has been weighed, it is recorded along with the weighing date, and if a predetermined incremental weight per week, say, 500 grams per week should be detected, a warning can be given to the pregnant woman, informing her that the observed weight increment indicates the possibility of gestational toxicosis and such like.

Figure 2:
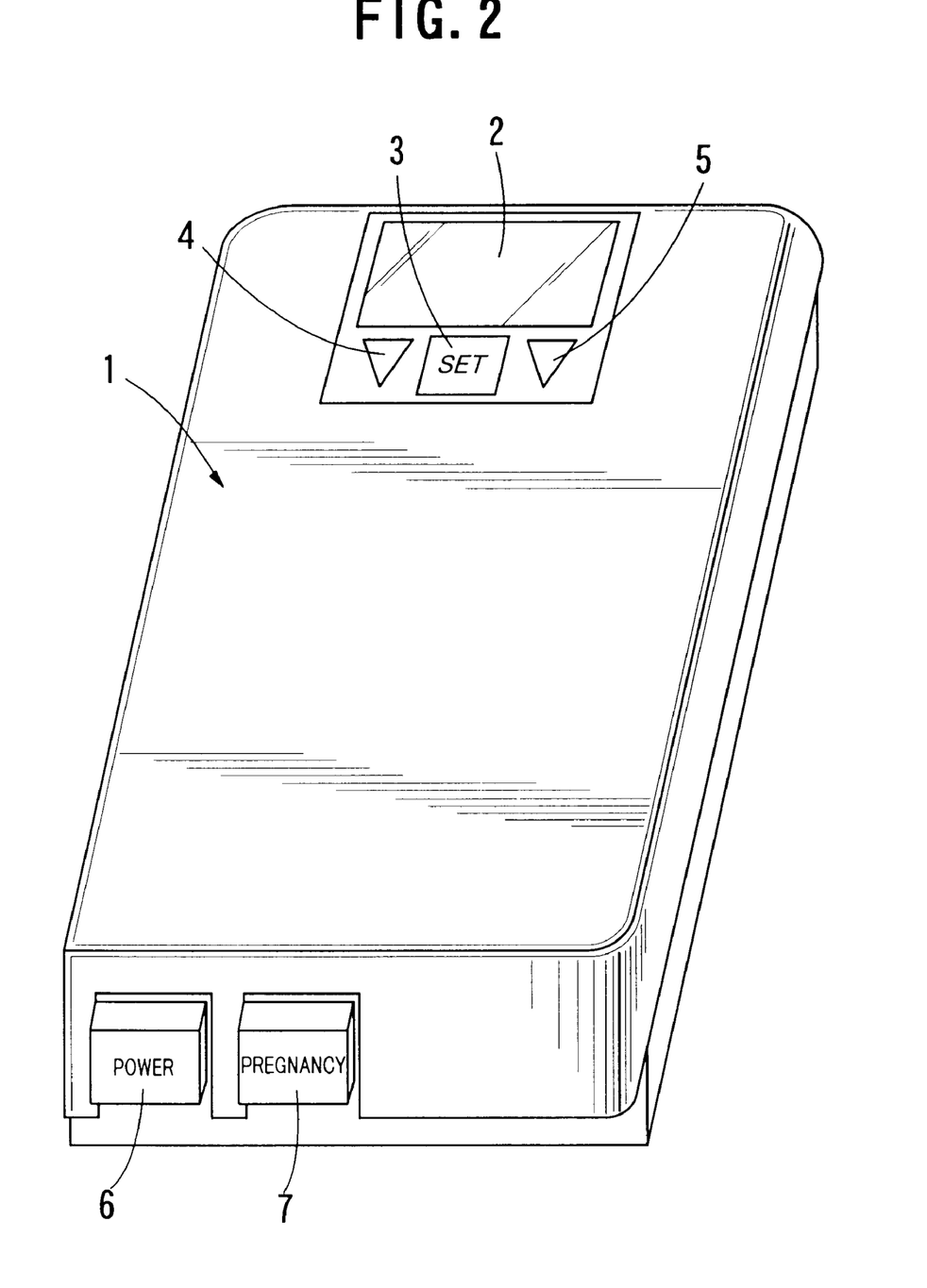
FIG. 2 is a perspective view of a weighing scale for weighing the weight of a pregnant woman.

Referring to FIG. 2, the weighing scale for weighing the weight of a pregnant woman according to the present invention comprises a display 2, a push button 3 for inputting some required data, a DOWN push button 4 for decreasing the quantity on display, and an UP push button 5 for increasing the quantity on display, all of which display and push buttons are arranged on the top surface of the scale body 1. The weighing scale has a power supply switch 6 and a mode switching device 7 for switching from the ordinary weight measuring mode to the antenatal weight or vice versa on one side of the body 1.

Figure 3:
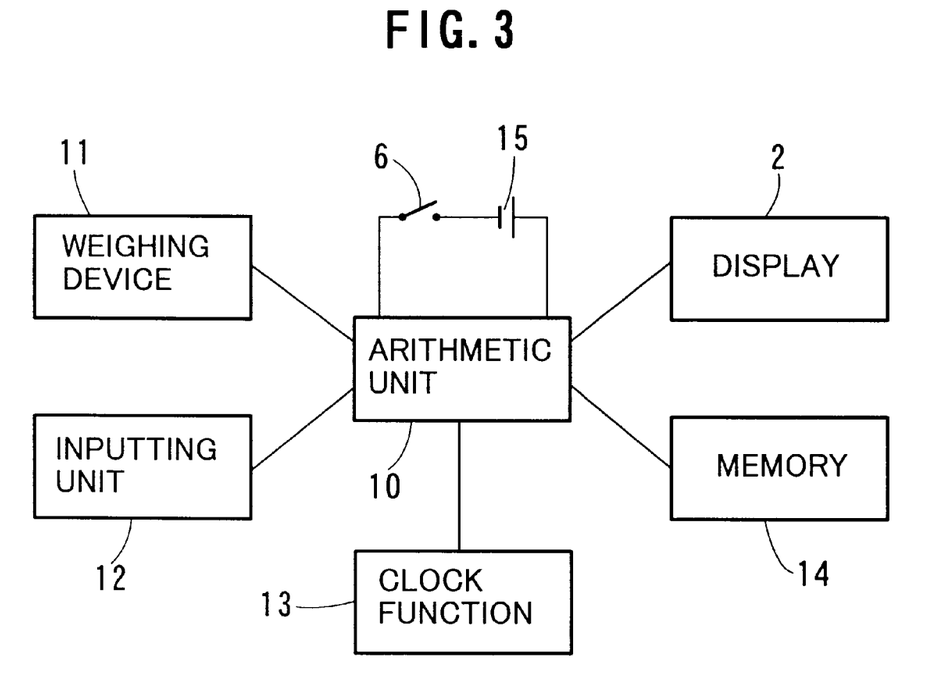
FIG. 3 is a block diagram of major components of the weighing scale.

Referring to FIG. 3, the major electronics of the weighing scale include: an arithmetic processor using a micro computer 10; an ordinary weighing device 11; a display 2; an inputting unit 12 including a setting push button 3, a DOWN push button 4 and an UP push button 5; an ordinary clock unit 13; and a nonvolatile memory unit 14 for storing data such as the results of calculations. A battery 15 and a switch 6 are series-connected across the arithmetic processor 10. The battery 15 can supply electric power to other parts which need electric power.

Referring to FIGS. 2 to 5, the manner in which the weighing scale works is described. First, the power supply switch 6 is depressed to allow the battery 15 to supply the arithmetic unit 10 and other parts with electricity (STEP 1). Then, the microcomputer in the arithmetic unit 10 is set for its initial condition. A decision is made as to whether the setting push button 3 is depressed or not (STEP 2). In the affirmative the proceeding goes to STEP 4 where the present date and the instantaneous time are set, as for instance follows: first, the present year is given by pushing the UP or DOWN buttons 5 and 4, thereby changing the number on display to the one representing the present year. Then, the setting button 3 is depressed to ready the scale for the setting of the month. The same procedure is repeated until the minute has been set, and then, the setting push button 3 is depressed to finish the inputting of data required for clock function. Thereafter, the proceeding goes to STEP 5. Once the step 4 has been finished, the clock function 13 continues to work independently even after the power supply switch 6 turns off, thus permitting the display 2 to show the exact date and time when the power supply switch 6 turns on again.

Figure 4:
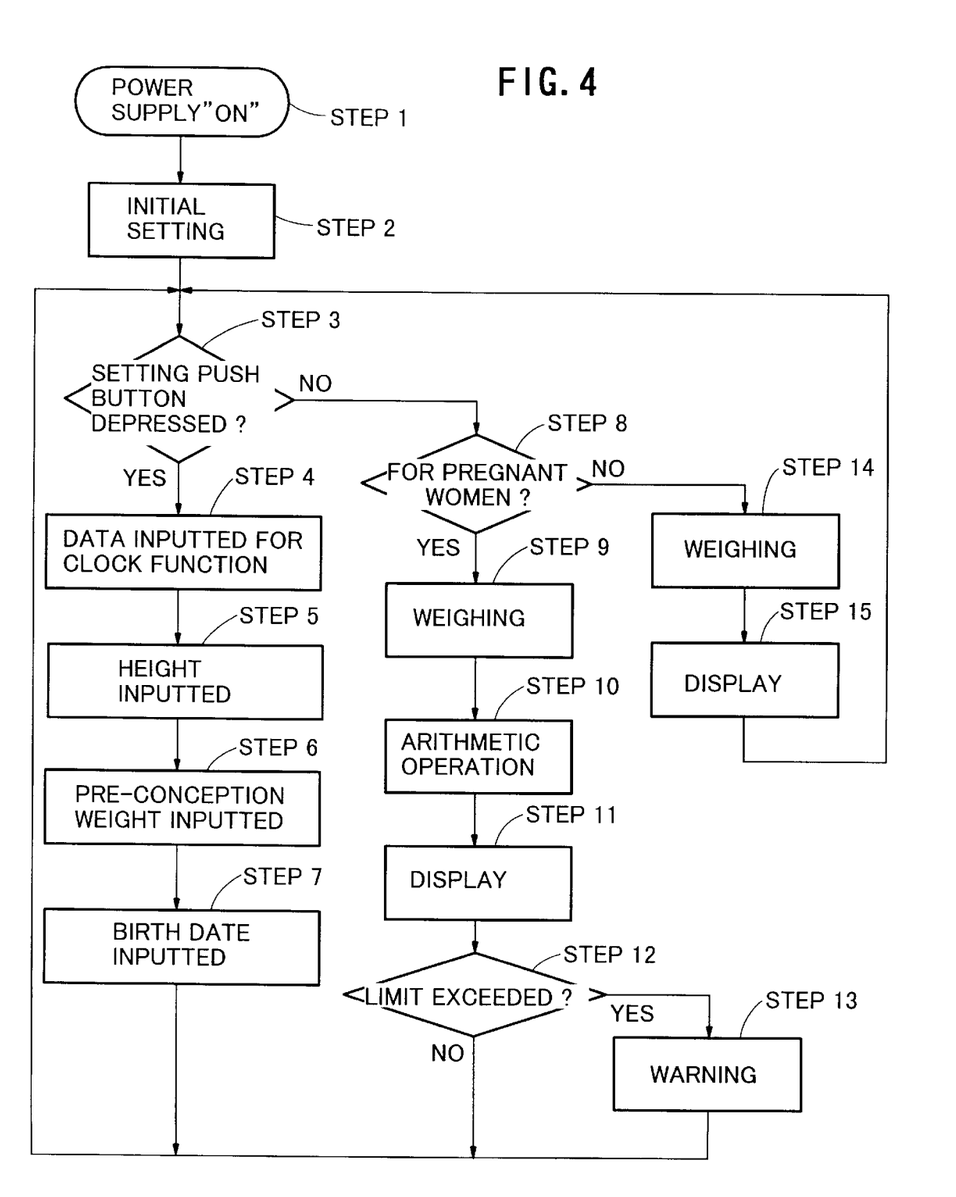
FIG. 4 shows a flow chart illustrating how the weighing scale works.
Figure 5A:
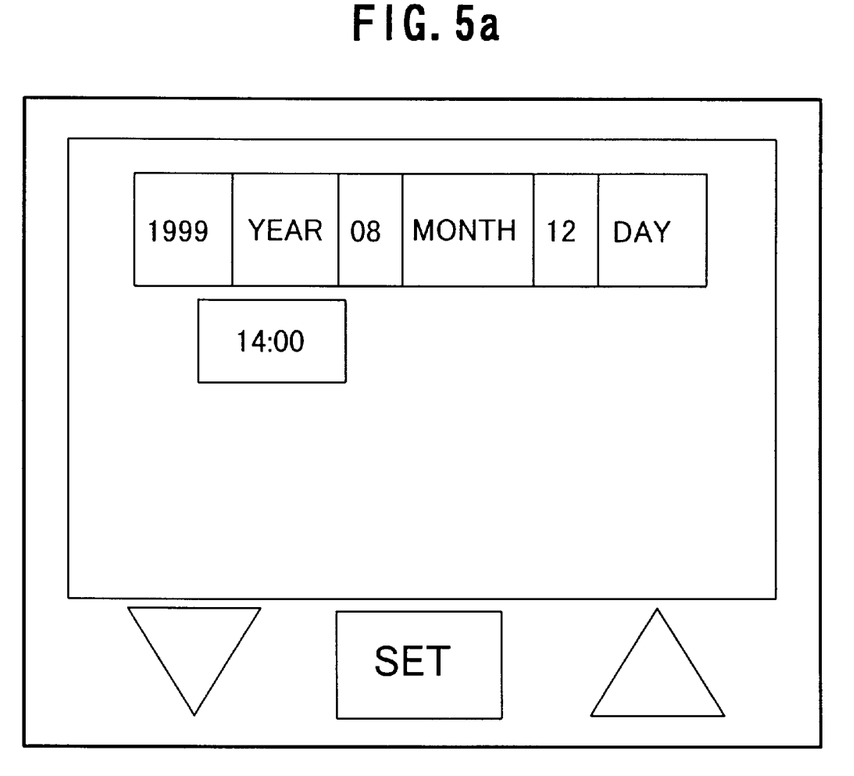
FIGS. 5a to 5f show different pieces of information given on the display of the weighing scale.
Figure 5B:
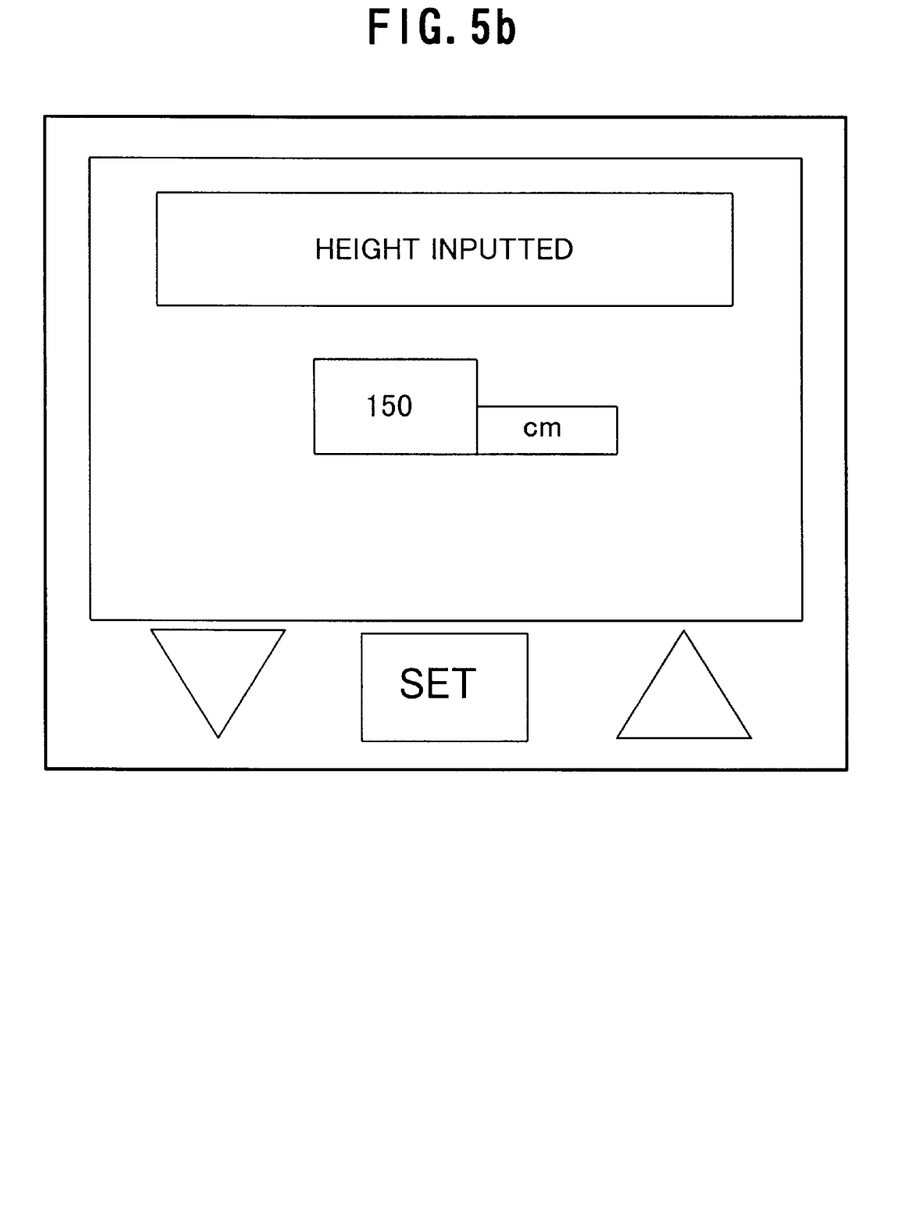
Figure 5C:
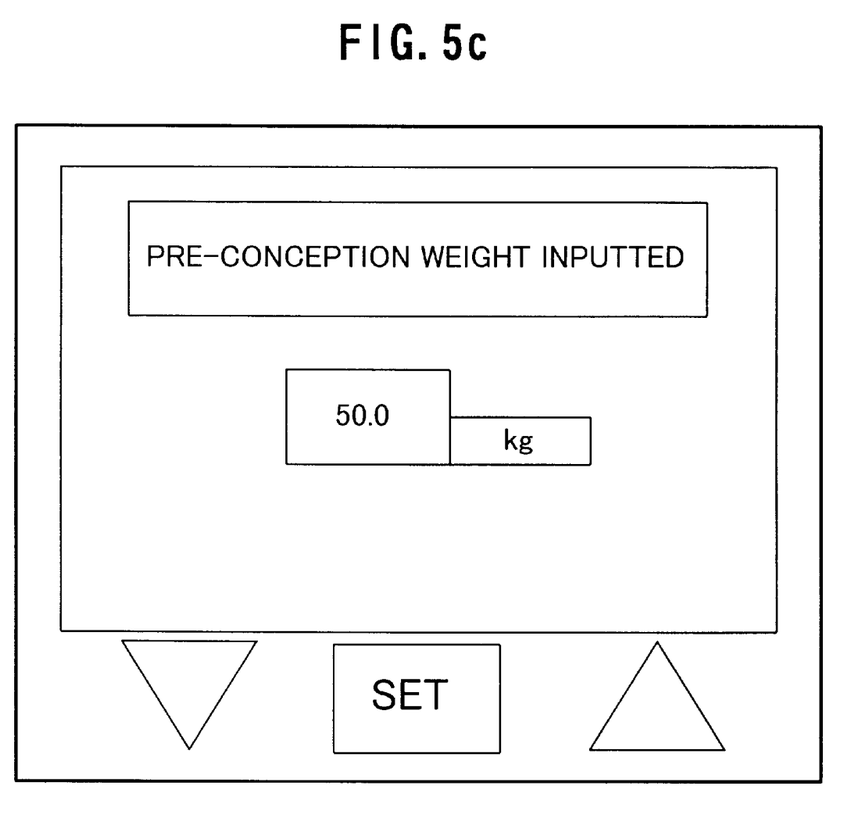
Figure 5D:
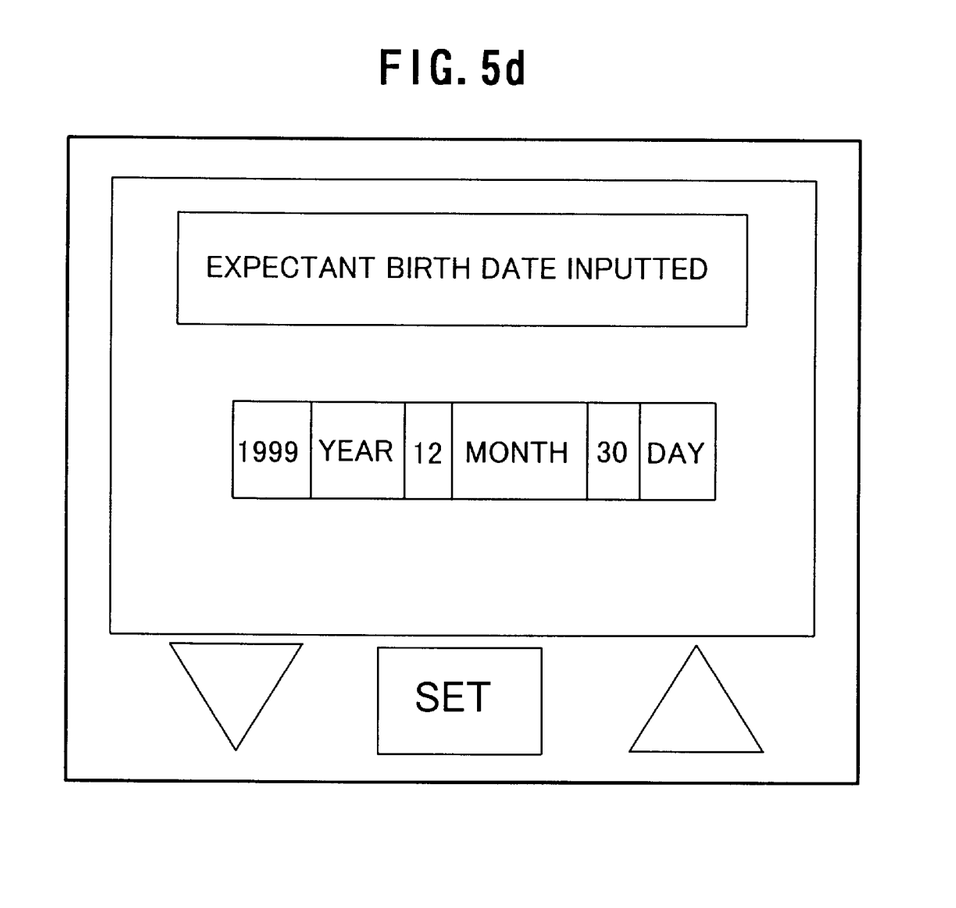

At STEP 5 the height of the pregnant woman is inputted. At first, the display 2 shows, for instance, 150 cm as an initial value of height, which is increased or decreased by means of UP key 4 or DOWN key 5 until it shows a number representing the exact height of the pregnant woman. Then, the setting push button 3 is depressed to store the exact height in the memory 14 for later use in calculation. Then, the proceeding goes to STEP 6 where the progestational weight is inputted. As shown in FIG. 5c, 50.0 kilograms appears as an initial weight value in the display 2, and it is changed by means of UP key 4 or DOWN key 5 until it shows the exact progestational weight. Then, the setting push button 3 is depressed to store the progestational weight in the memory 14 for later use in calculation. Then, the proceeding goes to STEP 7 where the expectant birth date is inputted as shown in FIG. 5d. Then, the setting push button 3 is depressed to store the expectant birth date in the memory 14 for later use in calculation.

The setting push button 3 is not depressed after such data have been inputted, allowing a negative decision to be made at STEP 3. Then, the proceeding goes to STEP 8, where the weighing scale is allowed to work in the pregnant weight weighing mode as selected by the mode switching device 7, and the weight of the pregnant woman is weighed at STEP 9. The so determined antenatal weight along with the measurement date is stored in the memory 14 for calculation at STEP 10. Specifically at the step 10 the arithmetic unit 10 determines: the BMI of the pregnant woman from her weight and height; the number of weeks passed since conception, which can be calculated from the present date and the expectant birth day; and a most appropriate antenatal weight for the present week from the antenatal weight-versus-week curve plotted for the BMI of the pregnant woman. Also, the arithmetic unit 10 determines by what percent of the most appropriate antenatal weight the present weight of the pregnant woman is above or below the most appropriate antenatal weight. The arithmetic unit 10 determines how much the pregnant woman has gained weight relative to the last antenatal weight, which was determined a predetermined length of time ago. For instance, she has gained one kilogram-heavy weight in one week since the last measurement of weight.

Figure 5E:
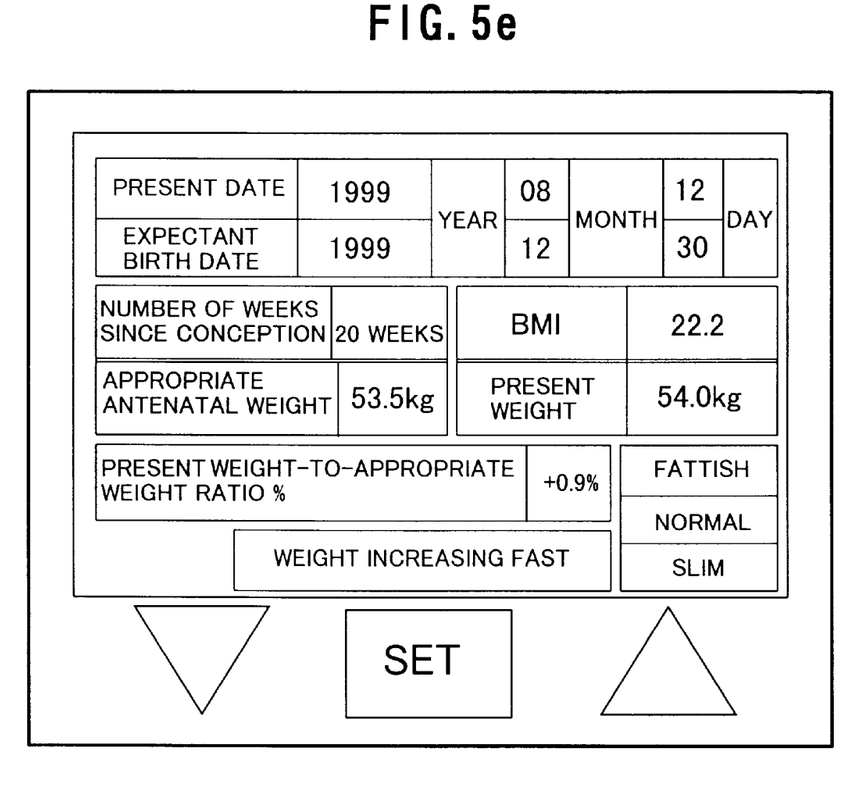

At STEP 1 the results of calculation are given in the display 2 as shown in FIG. 5e. At STEP 12 a decision is made as to whether or not her weight has increased a predetermined amount of weight (for example, 500 or more grams) in a predetermined length of time (for example, one week). In the negative the proceeding returns to STEP 3. In the affirmative a warning is given, and then the proceeding returns to STEP 3.

Figure 5F:
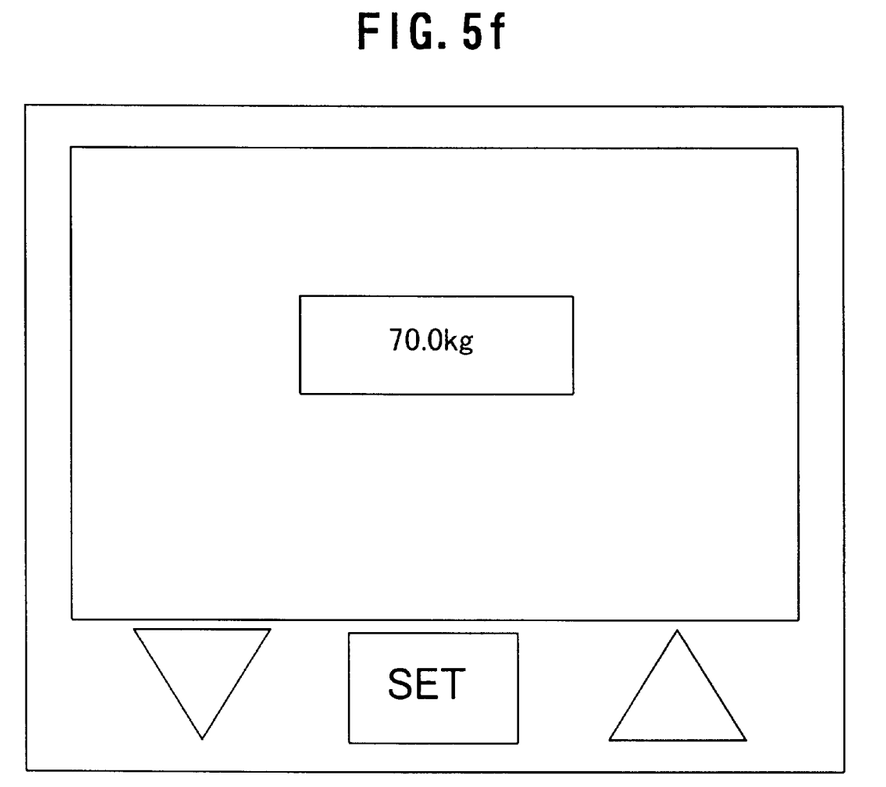

In case that the mode switching device 7 is not depressed, a negative decision is made at STEP 8, allowing the proceeding to go to STEP 14 for measuring the weight of the pregnant woman, which is given in the display 2 as seen from FIG. 5f. Then, the proceeding returns to STEP 3.

Figure 6:
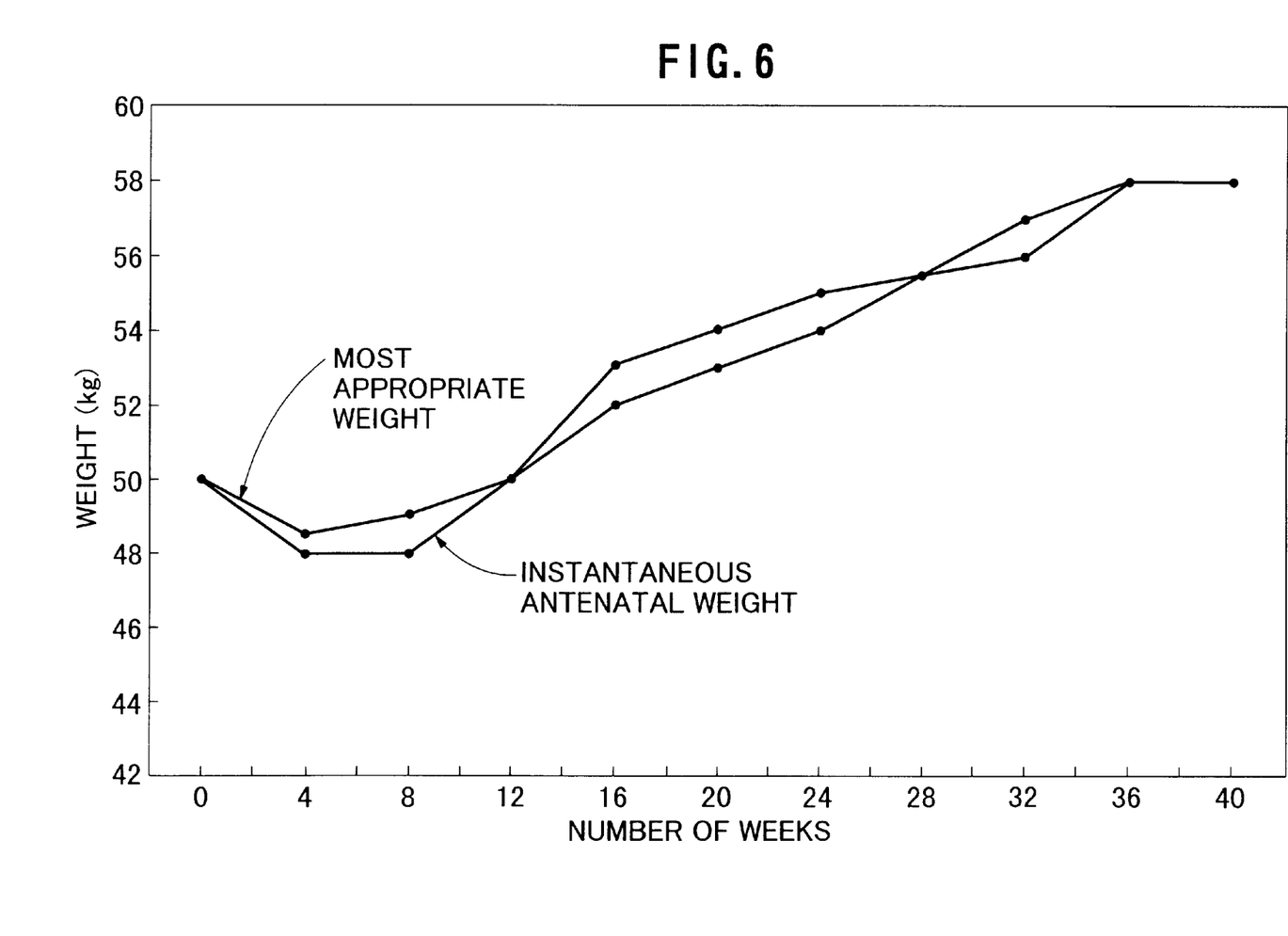
FIG. 6 is a graphic representation facilitating comparison of the instantaneous antenatal weight with the varying most appropriate antenatal weight.
Figure 7:
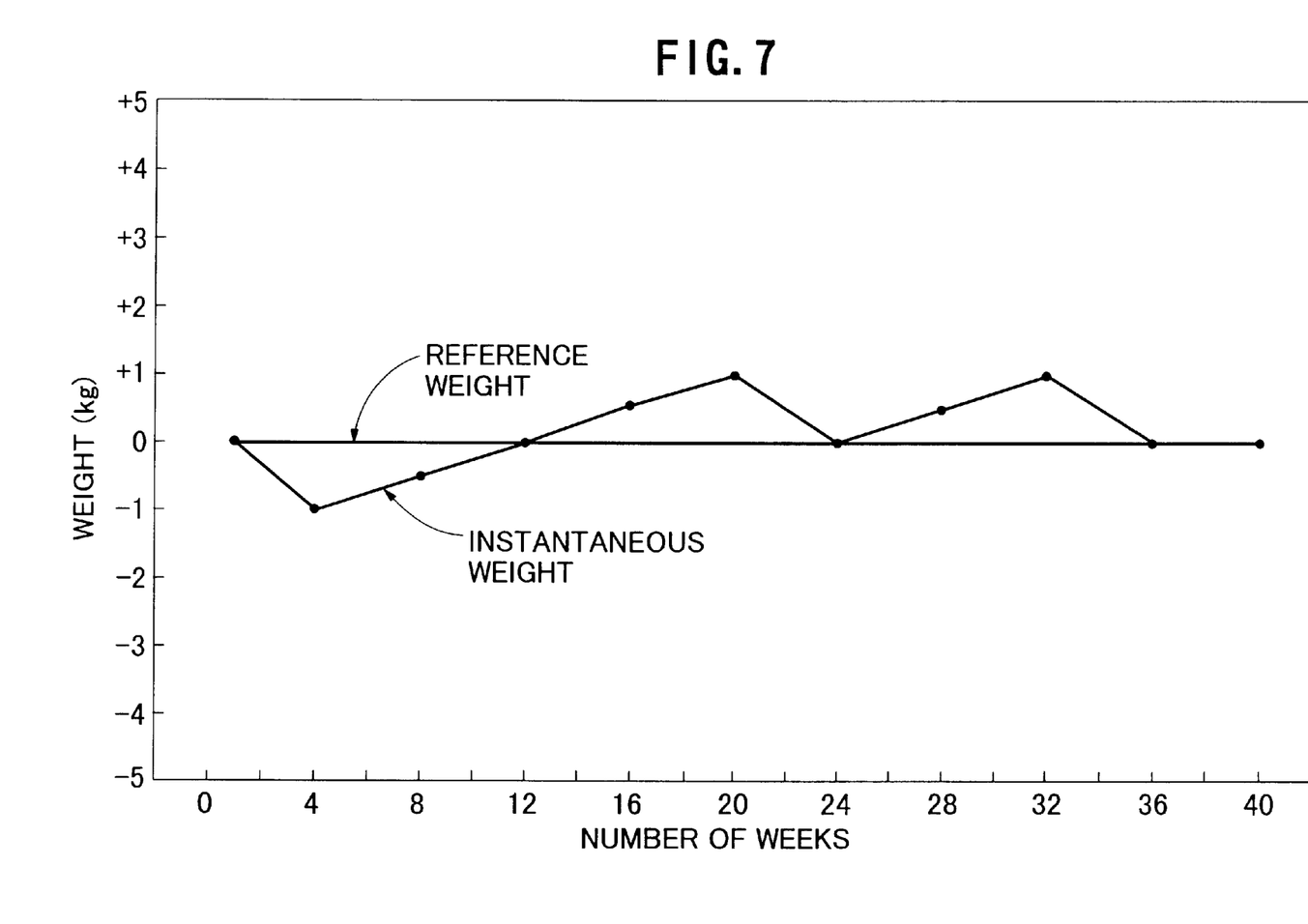
FIG. 7 is another graphic representation of the instantaneous antenatal weight relative to a reference weight of non-pregnant woman plotted for a different BMI.

In the weighing scale as described above an indication is given in terms of comparison between the present weight and the most appropriate weight determined from the antenatal weight-versus-week curve plotted for the BMI of the pregnant woman. Every time the weight has been weighed to store the so determined weight and the number of weeks since conception in the memory 14, a graphic representation may be given to show how the antenatal weight varies with the number of weeks since conception. This visual display facilitates the comparison of the instantaneous antenatal weight with the varying most appropriate antenatal weight, much easier than the comparison in terms of numerical values, as seen from FIG. 6. Another example of graphic representation can be given by a reference curve representing the appropriate weight of non-pregnant woman plotted for a different BMI and by a curve representing the instantaneous antenatal weight of a pregnant woman, permitting the pregnant woman to realize immediately how many kilograms her weight has increased or decreased, as seen from FIG. 7.

A memory switch of the type used in an ordinary weighing scale or body fat gauge may be used for the mode switching device 7 permitting the switching from the antenatal weighing use to the ordinary weighing use or vice versa. This facilitates the weight control-and-observation both of a pregnant woman and each member of her family.

The power supply switch 6 and the mode switching device 7 can be combined together to provide a single switch which is responsive to the first push for making the electric supply turn on, and responsive to the second push for functioning to weigh the antenatal weight.

In the weighing scale described above the inputting of the expectant birth date permits determination of the number of weeks since conception. As a matter of course, the number of weeks since conception may be calculated from the calendar to be inputted.

A most appropriate weight for a pregnant woman is determined from data stored in the memory. Alternatively it may be calculated manually to be inputted to the memory.

Also, the weighing scale may be equipped with a data confirmation unit, thereby making it possible to confirm that a required type of data be stored in the memory.

As may be understood from the above, a weighing scale for a pregnant woman according to the present invention permits determination of a most appropriate antenatal weight in terms of individual physical features, and comparison between the present antenatal weight and the most appropriate antenatal weight. A warning is given to inform a pregnant woman that her antenatal weight has increased a predetermined amount over the most appropriate antenatal weight, which implies a possibility of suffering from gestational toxicosis. The same warning can be given in case that the increasing rate of weight (a predetermined increment of weight per a predetermined length of time) increases beyond a given limit. The number of weeks since conception may be determined and displayed simply by inputting the expectant birth date.

What is claimed is:

1. A weighing scale for determining the weight of a pregnant woman comprising: a height inputting unit for inputting the height of the pregnant woman; a weight inputting unit for inputting her weight prior to conception; a week-number inputting unit for inputting how many weeks have passed since conception; a memory unit which stores antenatal weight data in terms of a body mass index; an arithmetic unit which determines a most appropriate weight from the data inputted by said height, weight and week-number inputting units and the data retrieved from said memory unit; and a display unit which displays the results of a calculation of the most appropriate antenatal weight.

2. A weighing scale according to claim 1 wherein said week-number inputting unit is for inputting the expectant birth date in place of the number of weeks since conception.

3. A weighing scale according to claim 1 wherein said week-number inputting unit is for inputting the number of weeks since conception.

4. A weigh in g scale according to claim 1 wherein said memory unit stores most appropriate weights plotted for different body mass indexes, which weights vary with each number of weeks since conception.

5. A weighing scale for determining the weight of a pregnant woman comprising: a height inputting unit for inputting the height of the pregnant woman; a weight inputting unit for inputting her weight prior to conception; a week-number inputting unit for inputting how many weeks have passed since conception; a memory unit which stores weight data in terms of a body mass index; a weighing device which determines her weight, an arithmetic unit which determines a most appropriate antenatal weight from the data inputted by said height, weight and week-number inputting units and the data retrieved from said memory unit, and which compares the so determined most appropriate antenatal weight with present weight of the pregnant woman; and a display unit which displays the result of calculation.

6. A weighing scale according to claim 5 wherein said week-number inputting unit is for inputting the expectant birth date in place of the number of weeks since conception.

7. A weighing scale according to claim 5 wherein said week-number inputting unit is for inputting the number of weeks since conception.

8. A weighing scale according to claim 5 wherein said arithmetic unit causes said display unit to display a warning in response to the antenatal weight increasing a predetermined amount over the most appropriate antenatal weight.

9. A weighing scale according to claim 5 said memory unit stores most appropriate antenatal weights for different body mass indexes, which weights vary with the number of weeks since conception.

10. A weighing scale according to claim 5 wherein said arithmetic unit causes said display unit to display a warning, provided that the antenatal weight has increased a predetermined amount in a predetermined length of time.

11. A weighing scale for determining the weight of a pregnant woman comprising: a height inputting unit for inputting the height of the pregnant woman; a weight inputting unit for inputting her weight prior to conception; a week-number inputing unit for inputting how many weeks have passed since conception: a memory unit which stores antenatal weight data in terms of BMIs; an arithmetic unit which determines a most appropriate weight from the data inputted by said height, weight and week-numbered inputting units and the data retrieved from said memory unit, and which determines a most appropriate weight curve representing how the most appropriate antenatal weight varies with the number of weeks since conception and an instantaneous weight curve representing how the instantaneous weight varies with the number of weeks since conception; and a display unit which displays the most appropriate weight curve and the instantaneous weight curve for comparison.

12. A weighing scale for determining the weight of a pregnant woman comprising: a unit which provides reference curves plotted for different BMIs each representing how the appropriate weight of non-pregnant women for a selected BMI varies with time, a weight scaling unit which weighs the instantaneous weight of the pregnant woman, and a display which shows how the instantaneous weight varies relative to the selected reference curve.

13. A weighing scale for determining the weight of a pregnant woman according to any of the preceding claims wherein it further comprises a weighing-mode switching device which switches from the pregnant women's weight observation use to an ordinary weighing use and vice versa.

* * * * *